(12) United States Patent
Huang et al.

(10) Patent No.: US 7,660,087 B2
(45) Date of Patent: Feb. 9, 2010

(54) ELECTROSTATIC DISCHARGE AVOIDING CIRCUIT

(75) Inventors: Shao-Chang Huang, Hsinchu (TW); Hsin-Ming Chen, Tainan County (TW)

(73) Assignee: eMemory Technology Inc., Hsin-chu (TW)

( * ) Notice: Subject to any disclaimer, the term of this patent is extended or adjusted under 35 U.S.C. 154(b) by 0 days.

(21) Appl. No.: 12/106,346

(22) Filed: Apr. 21, 2008

(65) Prior Publication Data

US 2009/0168280 A1 Jul. 2, 2009

(30) Foreign Application Priority Data

Jan. 2, 2008 (TW) ............................... 97100042 A

(51) Int. Cl.
*H02H 9/04* (2006.01)
(52) U.S. Cl. .......................................... 361/56
(58) Field of Classification Search .............. 361/56
See application file for complete search history.

(56) References Cited

U.S. PATENT DOCUMENTS 7,271,988 B2 * 9/2007 Chung et al. .................. 361/56
2005/0286186 A1 * 12/2005 Chang ........................... 361/56

* cited by examiner

*Primary Examiner*—Stephen W Jackson
*Assistant Examiner*—Angela Brooks
(74) *Attorney, Agent, or Firm*—Jianq Chyun IP Office

(57) ABSTRACT

An ESD avoiding circuit includes a first ESD protection unit, an ESD detection unit, a switch unit, and an RC filter unit. The first ESD protection unit transmits an ESD current between a first conducting path and a second conducting path. The ESD detection unit is coupled to the first conducting path. The ESD detection unit includes an input terminal, and an output terminal coupled to the first ESD protection unit for detecting an ESD and controlling the first ESD protection unit to conduct the ESD current according to a detection result. The switch unit is coupled between the first conducting path and a core circuit and conducts the first conducting path to the core circuit according to signals of the input terminal and the output terminal of the ESD detection unit. The RC filter unit couples a first voltage to the input terminal of the ESD detection unit.

15 Claims, 11 Drawing Sheets

US 7,660,087 B2

ELECTROSTATIC DISCHARGE AVOIDING CIRCUIT

CROSS-REFERENCE TO RELATED APPLICATION

This application claims the priority benefit of Taiwan application serial no. 97100042, filed on Jan. 2, 2008. The entirety the above-mentioned patent application is hereby incorporated by reference herein and made a part of specification.

BACKGROUND OF THE INVENTION

1. Field of the Invention

The present invention relates to electrostatic discharge (ESD) avoiding circuit, and more particularly, to an ESD avoiding circuit which avoids an ESD current from flowing into a core circuit when the ESD occurs, and provides an operation voltage to the core circuit when working in a regular operation mode.

2. Description of Related Art

In operation, electronic products may suffer ESD, and sometimes are damaged by the ESD affection. ESD usually generates a voltage much larger than voltages provided by ordinary power supplies. As such, when an ESD occurs, the ESD current may burn the component on which it applies. Therefore, ESD protection circuits are usually employed in some circuits for dissipating the ESD current.

FIG. 1 is a circuit diagram of a conventional ESD protection apparatus. Referring to FIG. 1, there is shown an N-type metal oxide semiconductor (NMOS) transistor N0. The NMOS transistor N0 is a metal oxide semiconductor (MOS) transistor having a thick oxide layer. A trigger-on voltage Vt of the NMOS transistor N0 is about 6 to 10 volts, e.g., Vt=8 volts. In a regular operation mode, the core circuit 120 is operated with a predetermined programming voltage. The programming voltage may be a voltage varying according to a clock, a swinging voltage, or a fixed power source voltage. The programming voltage is assumed as a fixed power source voltage, for example 7 volts.

In an ESD mode, as shown in FIG. 1, an ESD high voltage enters from a pad 110. Meanwhile, if the trigger-on voltage Vt of the NMOS transistor N0 is higher than the programming voltage, the ESD current will very likely enter the core circuit 120 before the NMOS transistor N0 is turned on. In other words, the ESD current cannot be guided via the NMOS transistor N0 to a ground voltage trace line VSS. Instead, it enters the core circuit 120 and damages internal components of the core circuit 120.

FIG. 2A is a circuit diagram of a conventional ESD protection apparatus. Referring to FIG. 2A, this conventional ESD protection apparatus utilizes a surface triggering technology to lower the trigger-on voltage of the MOS transistor N0, which is about 1 volt. When working in the ESD mode, an ESD high voltage enters from a pad 210, a high level signal, i.e., a signal of the pad 210, is coupled via a P-type metal oxide semiconductor (PMOS) transistor P1 to a gate of the NMOS transistor N0, so as to conduct the NMOS transistor N0, and thus guiding the ESD current to the ground voltage trace line VSS.

When working in the regular operation mode, the programming voltage enters from the pad 210, an RC circuit composed of a resistor R and a capacitor C provides a high level signal to an input terminal of an inverter 230. The inverter 230 is composed of a PMOS transistor P1 and an NMOS transistor N1. The high level signal is inverted by the inverter 230, and thereafter conducts the NMOS transistor N1, and therefore pulls down a gate voltage of the NMOS transistor N0 to the ground voltage VSS, so that the NMOS transistor N0 is not conducted. In such a way, the NMOS transistor N0 can be prevented from being incorrectly conducted and generating a leak current thereby.

However, a certain time is needed prior to achieving and providing a fixed programming voltage. During the period of boosting the programming voltage, supposing the programming voltage is to be boosted from 0 volt to 3.3 volts, the PMOS transistor P1 inside the inverter 230 may likely be conducted, and further the NMOS transistor N0 is conducted accordingly. Therefore, a part of the leak current will be guided via the NMOS transistor N0 to the ground voltage trace line VSS.

Further, in the regular operation mode, in order to prevent the RC circuit from delaying the signal of the pad 210 and whereby causing a misoperation of the inverter 230, the pad 210 should not be connected to a swinging voltage. FIG. 2B illustrates another coupling configuration of the ESD protection apparatus of FIG. 2A. Referring to FIG. 2B, a pad 240 which is electrically coupled to a stable power source, e.g. 3.3 volts, and the pad 210 is an input pad or an output pad. When working in an ESD mode and the ESD high voltage enters from the pad 210, the pad 240 can be taken as floating connected, and therefore theoretically, an input terminal of the inverter 230 is featured by a low level signal. The low level signal is inverted by the inverter 230, and therefore conducts the NMOS transistor N0, and guides the ESD current to the ground trace line VSS.

According to the configuration shown in FIG. 2B, although when working in the regular operation mode the pad 210 can be electrically connected to a swinging voltage, when a higher programming voltage (comparing with the foregoing power source, assuming the programming voltage is 7 volts hereby) may likely conduct the PMOS transistor P1 inside the inverter 230, and therefore the NMOS transistor N0 is conducted, and thus generating a leakage current thereby.

Further, the NMOS transistor N0 employed in the ESD protection apparatus as shown in FIGS. 1, 2A and 2B are directly coupled to the pads 110, 210. In a typical layout, a silicide block is often used for blocking implanting silicide at a drain of the NMOS transistor N0, and thus increasing the surface resistor of the drain of the NMOS transistor N0. Therefore, in such a way, when an ESD occurs, it can be guaranteed that the ESD current will be guided flowing through a parasite transistor in the NMOS transistor N0 to the ground voltage trace line VSS, rather than flowing through a P-type channel of the NMOS transistor N0, which may damage the gate of the NMOS transistor N0. Likewise, the core circuits 120, 220 are directly coupled to the pads 110, 210, respectively, and source/drains of their internal transistors should also include silicide block for blocking implanting silicide to protect internal gates thereof. However, the implantation of the silicide block directly affects the size of the layout.

SUMMARY OF THE INVENTION

Accordingly, the present invention is directed to an electrostatic discharge (ESD) avoiding circuit. The ESD avoiding circuit is adapted for avoiding an ESD current from flowing into a core circuit and preventing the components of the core circuit from being damaged when an ESD occurs. When the core circuit is regularly operated, the ESD avoiding circuit serves as an input/output (I/O) interface providing an electrical connection for the core circuit to external. The ESD avoiding circuit not only allows providing a voltage higher than an operation voltage of the core circuit to the core circuit for operation, but also is adapted to effectively avoid the occurrence of the leak current.

The present invention provides an ESD avoiding circuit including a first ESD protection unit, an ESD detection unit, a switch unit, and an RC filter unit. The first ESD protection unit is adapted for transmitting an ESD current between a first conducting path and a second conducting path. The ESD detection unit is coupled to the first conducting path. The ESD detection unit includes an input terminal, and an output terminal coupled to the first ESD protection unit, for detecting whether an ESD occurred, and controlling the first ESD protection unit to conduct the ESD current or not according to a result of the detection. The switch unit is coupled between the first conducting path and a core circuit, for determining to conduct the first conducting path to the core circuit or not according to signals of the input terminal and the output terminal of the ESD detection unit. The RC filter unit is coupled between the second conducting path and a third conducting path, for coupling a first voltage to the input terminal.

According to an embodiment of the present invention, the RC filter unit includes a first resistor and a first capacitor. The first resistor includes a first terminal and a second terminal respectively coupled to the third conducting path and the input terminal of the ESD detection unit. The first capacitor includes a first terminal and a second terminal respectively coupled to the second terminal of the first resistor and the second conducting path.

According to an embodiment of the present invention, the switch unit includes a first transistor and a second transistor. The first transistor includes a gate, a first source/drain, a second source/drain, and a substrate, respectively coupled to the input terminal of the ESD detection unit, the first conducting path, the core circuit, and the second conducting path. The second transistor includes a gate, a first source/drain, a second source/drain, and a substrate, respectively coupled to the output terminal of the ESD detection unit, the first source/drain and the second source/drain of the first transistor, and the third conducting path.

According to an embodiment of the present invention, the ESD detection unit further includes a third transistor and a fourth transistor. The third transistor includes a substrate, a first source/drain, a second source/drain, and a gate. The substrate and the first source/drain of the third transistor are coupled to the first conducting path. The gate and the second source/drain of the third transistor respectively serve as the input terminal and the output terminal of the ESD detection unit. The fourth transistor includes a substrate, a first source/drain, a second source/drain, and a gate. The gate and the first source/drain of the fourth transistor are respectively coupled to the gate and the second source/drain of the third transistor. The substrate and the second source/drain of the fourth transistor are coupled to the second conducting path.

According to an embodiment of the present invention, the first ESD protection unit further includes a fifth transistor including a gate, a first source/drain, a second source/drain and a substrate. The gate and the first source/drain of the fifth transistor are respectively coupled to the output terminal of the ESD detection unit and the first conducting path. The substrate and the second source/drain of the fifth transistor are coupled to the second conducting path.

The present invention provides an ESD detection unit for detecting an occurrence of an ESD, so that when such an ESD occurs, the first ESD protection unit is controlled to guide the ESD current in time, and the switch unit is controlled to cut off the transmitting path between first conducting path and the core circuit. When the core circuit is regularly operated, the ESD detection unit controls the switch unit to conduct the first conducting path to the core circuit, and guarantees to provide the operation voltage to the core circuit. Further, the RC filter circuit couples the first voltage to the input terminal of the ESD detection unit, so as to avoid misoperation of the ESD detection unit as well as the leakage current caused thereby.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
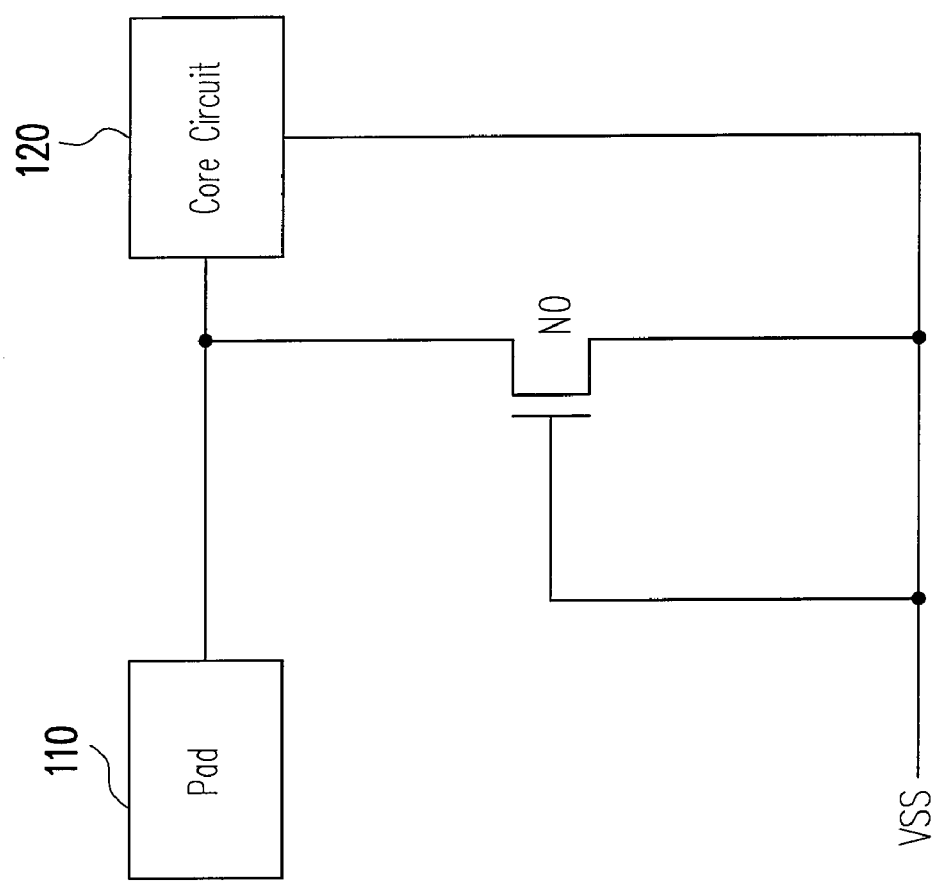
FIG. 1 is a circuit diagram of a conventional ESD protection apparatus.
Figure 2A:
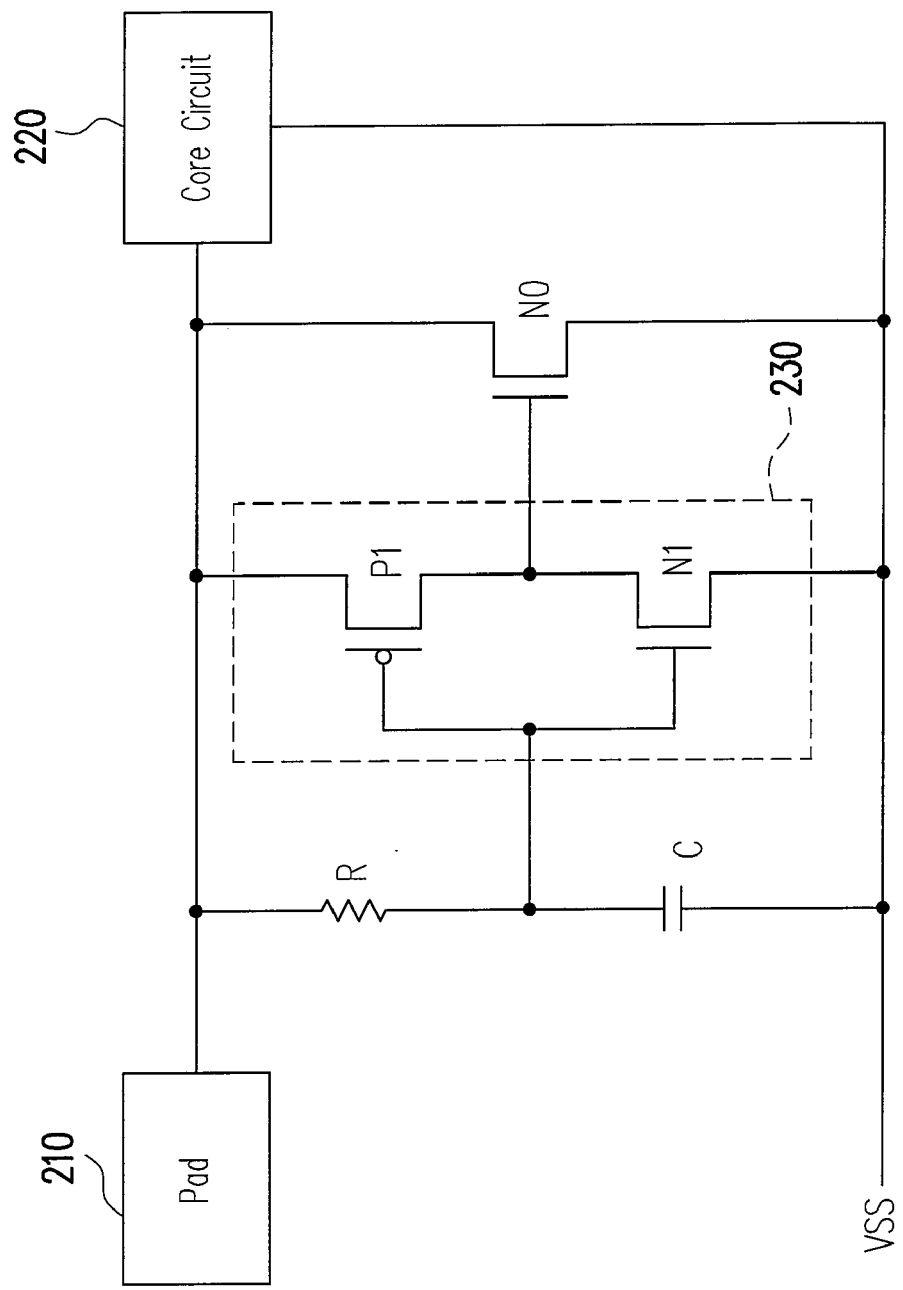
FIG. 2A is a circuit diagram of a conventional ESD protection apparatus.
Figure 2B:
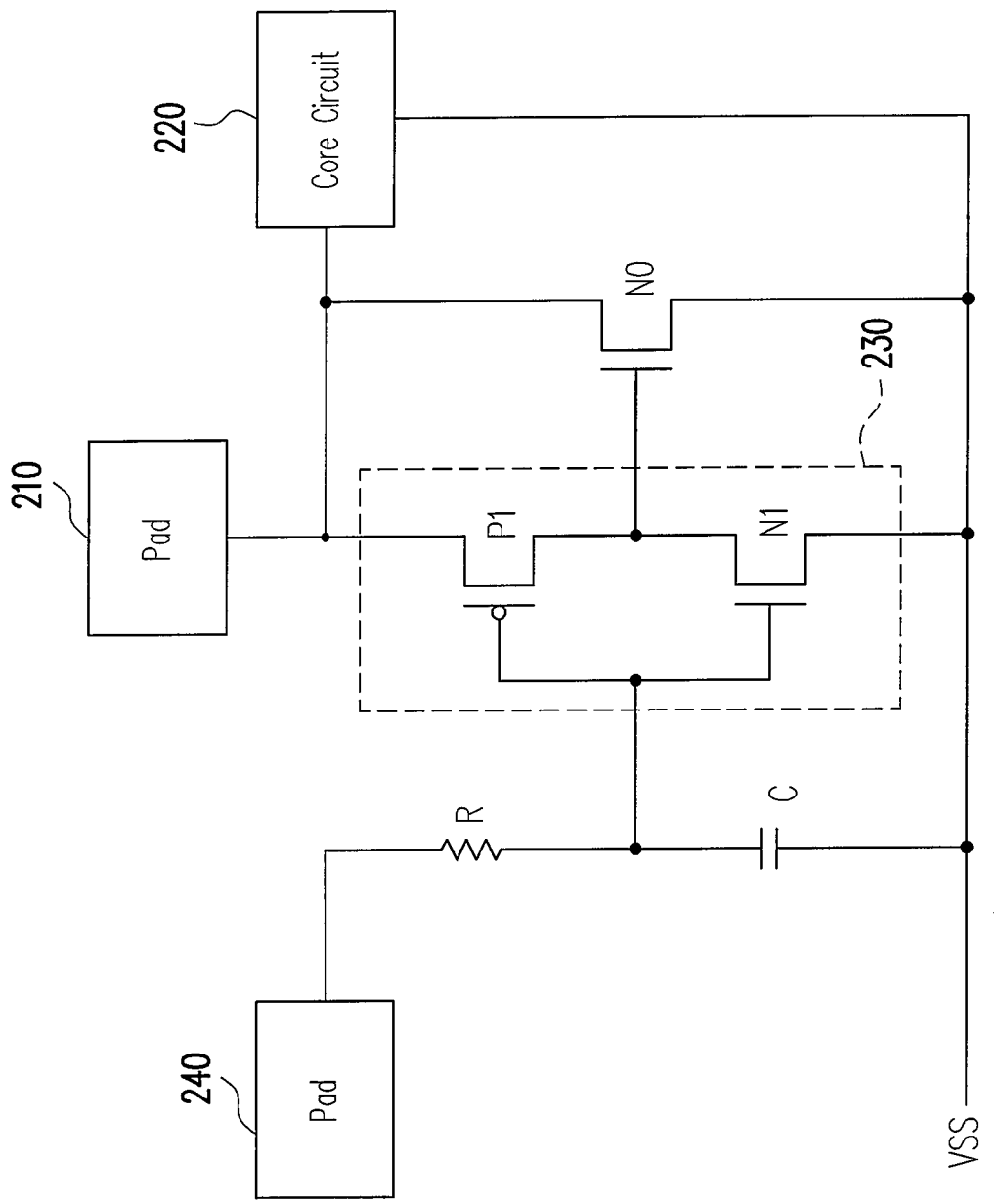
FIG. 2B illustrates another coupling configuration of the ESD protection apparatus of FIG. 2A.

Reference will now be made in detail to the present preferred embodiments of the invention, examples of which are illustrated in the accompanying drawings. Wherever possible, the same reference numbers are used in the drawings and the description to refer to the same or like parts.

Figure 3A:
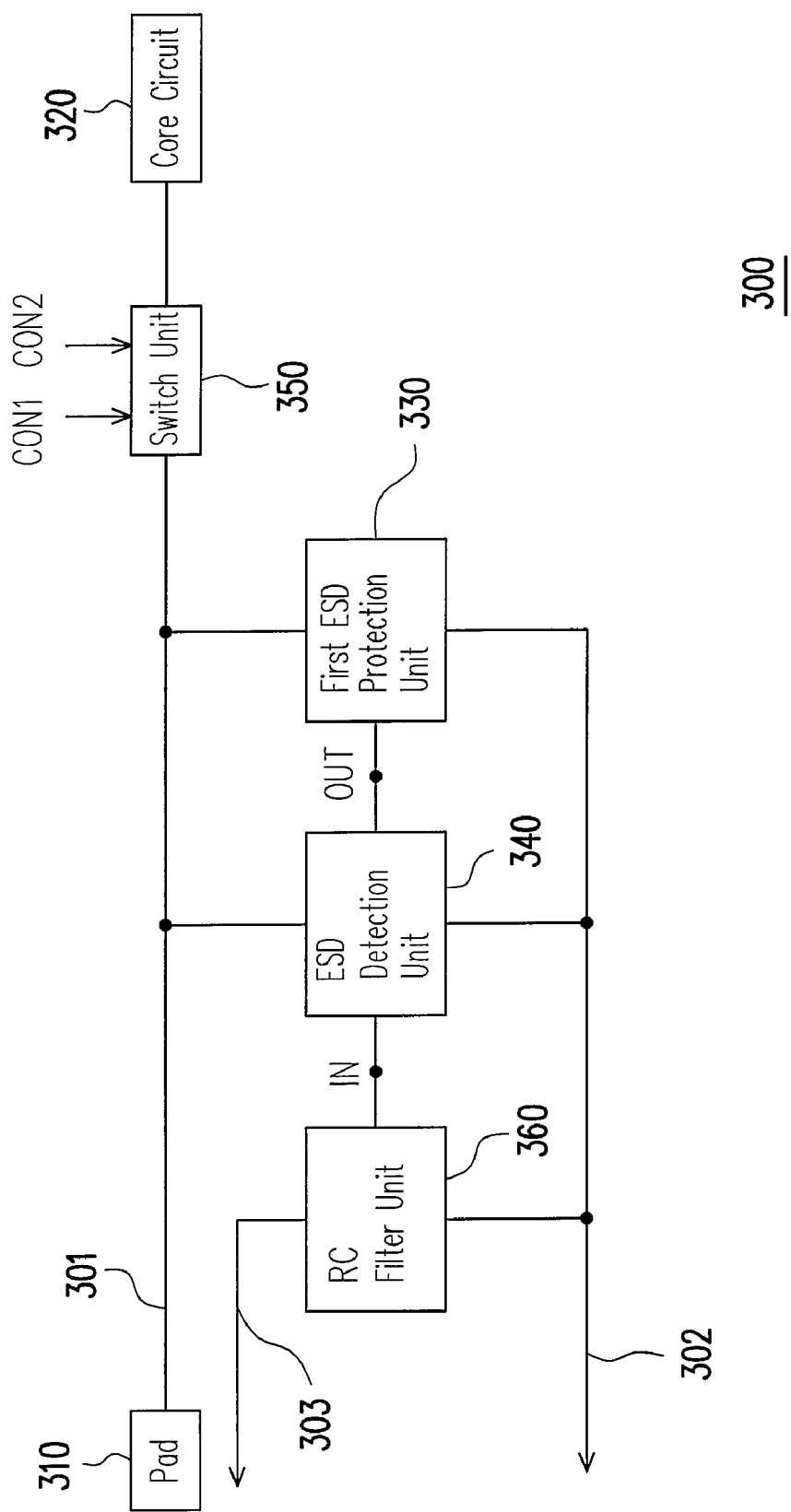
FIG. 3A is a structural diagram of an ESD avoiding circuit according to an embodiment of the present invention.

FIG. 3A is a structural diagram of an electrostatic discharge (ESD) avoiding circuit according to an embodiment of the present invention. Referring to FIG. 3A, there is shown an ESD avoiding circuit 300 including a first ESD protection unit 330, an ESD detection unit 340, a switch unit 350, and an RC filter unit 360. The first ESD protection unit 330 is adapted to transmit an ESD current between a first conducting path 301 and a second conducting path 302. The first conducting path 301 is coupled to a pad 310 serving as an input pad or an output pad. The ESD detection unit 340 is coupled between the first conducting path 301 and the second conducting path 302. The ESD detection unit 340 includes an input terminal IN, and an output terminal OUT coupled to the first ESD protection unit 330. The ESD detection unit 340 is adapted for detecting whether an ESD occurred, and controlling the first ESD protection unit 330 to conduct the ESD current according to a result of the detection.

The switch unit 350 is coupled between the first conducting path 301 and a core circuit 320, and is adapted to determine whether to conduct the first conducting path 301 to the core circuit 320 according to the signals of the input terminal IN and the output terminal OUT. The RC filter unit 360 is coupled between the second conducting path 302 and a third conducting path 303, for coupling a first voltage to the input terminal IN of the ESD detection unit 340, so as to avoid a misoperation of the ESD detection unit 340 as well as a leak current caused thereby. The units are to be illustrated in operation herebelow.

Figure 3B:
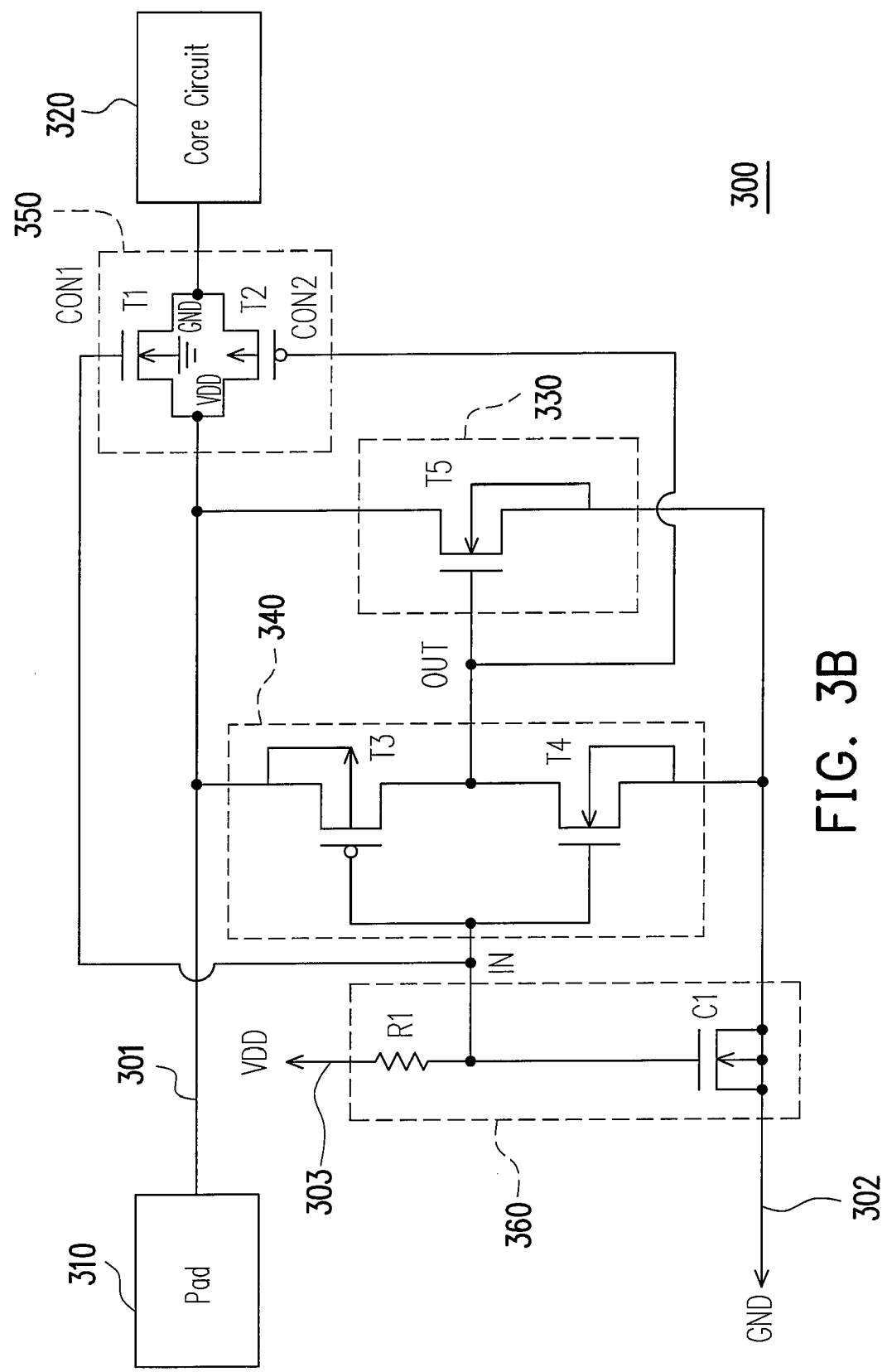
FIG. 3B is a circuit diagram of the ESD avoiding circuit of FIG. 3A.

FIG. 3B is a circuit diagram of the ESD avoiding circuit of FIG. 3A. Referring to FIGS. 3A and 3B, the RC filter unit 360 includes a resistor R1 and a capacitor C1. The capacitor C1 is realized by an N-type transistor. The N-type transistor includes a substrate, a source, and a drain. The substrate, the source, and the drain of the N-type transistor are coupled together as a whole which serves as an electrode terminal of the capacitor C1. The resistor R1 includes a first terminal and a second terminal, respectively coupled to the third conducting path 303 and the input terminal IN of the ESD detection unit 340. The capacitor C1 includes a first terminal and a second terminal respectively coupled to the second terminal of the resistor R1 and the second conducting path 302. It is assumed hereby that the second conducting path 302 is coupled to a ground voltage GND, and the third conducting path 303 is coupled to a system voltage VDD.

The ESD detection unit 340 includes transistors T3 and T4. The transistor T3 is a P-type transistor, and the transistor T4 is an N-type transistor. The transistor T3 includes a substrate, a first source/drain, a second source, and a gate. The substrate and the first source/drain of the transistor T3 are coupled to the first conducting path 301. The gate and the second source/drain of the transistor T3 are respectively served as to the input terminal IN and the output terminal OUT of the ESD detection unit 340. The transistor T4 includes a substrate, a first source/drain, a second source, and a gate. The gate and the first source/drain of the transistor T4 are respectively coupled to the gate and the second source/drain of the transistor T3. The substrate and the second source/drain of the transistor T4 are coupled to the second conducting path 302.

The first ESD protection unit 330 includes a transistor T5. The transistor T5 is an N-type transistor including a gate, a first source/drain, a second source/drain, and a substrate. The gate and the first source/drain of the transistor T5 are respectively coupled to the output terminal OUT of the ESD detection unit 340, and the first conducting path 301. The substrate and the second source/drain of the transistor T5 are coupled to the second conducting path 302. The switch unit 350 includes transistors T1 and T2. The transistor T1 is an N-type transistor, and the transistor T2 is a P-type transistor. The transistor T1 includes a substrate, a first source/drain, a second source, and a gate. The gate of the transistor T1 is coupled to the input terminal IN of the ESD detection unit 340 for receiving a signal CON1 of the input terminal IN. The first source/drain and the second source/drain of the transistor T1 are respectively coupled to the first conducting path 301 and the core circuit 320. The transistor T2 includes a substrate, a first source/drain, a second source/drain, and a gate. The gate of the transistor T2 is coupled to the output terminal OUT of the ESD detection unit 340, for receiving a signal CON2 of the output terminal OUT. The substrate, the first source/drain, the second source/drain of the transistor T2 are respectively coupled to a second voltage, e.g. the system voltage VDD, the first source/drain and the second source/drain of the transistor T1.

When a positive pulse of the ESD enters from the pad 310, the third conducting path 303 can be taken as floating connected, so as to couple the ground voltage GND via the capacitor C1 to the input terminal IN of the ESD detection unit 340. Therefore, the signals CON1 and CON2 of the input terminal and the output terminal of the ESD detection unit 340 respectively have logic low level, i.e. 0, and logic high level, i.e. 1, so that the transistors T1 and T2 inside the switch unit 350 are not conducted, and therefore the ESD current is blocked from flowing into the core circuit 320. On the other hand, the gate of the transistor T5 of the first ESD protection unit 330 receives the signal CON2 having a logic high level and is conducted thereby, and therefore the ESD current is guided to the second conducting path 302.

In a regular operation mode, supposing that a maximum system voltage of the core circuit 320 is 3.3 volts, the RC filter unit 360 couples the system voltage VDD to an input terminal IN of the ESD detection unit 340. Therefore, the signals CON1 and CON2 of the input terminal and the output terminal of the ESD detection unit 340 respectively have logic high level, i.e. 1, and logic low level, i.e. 0, so that the transistors T1 and T2 inside the switch unit 350 are conducted, and the operation voltage is provided to the core circuit 320 via the pad 310 for driving the core circuit 320 for regular operation. The operation voltage can be a voltage varying according to a clock, a swinging voltage, or a fixed power source voltage, with the maximum system voltage VDD of the core circuit 320 as an upper limit thereof. Because the signal CON2 of the output terminal OUT of the ESD detection unit 340 has logic low level, the transistor T5 inside the first ESD protection unit 330 is not conducted, so as to avoid the occurrence of the leak current. As such, the ESD avoiding circuit 300 of the embodiment also serves as an input/output (I/O) interface of the core circuit 320 when the core circuit 320 is operated in a regular operation mode.

It should be noted that although the first ESD protection unit 330 of the foregoing embodiments is realized with the transistor T5, it is not to restrict the scope of the present invention. Those skilled in the art can also realize the first ESD protection unit 330 with other components, such as a diode.

Figure 3C:
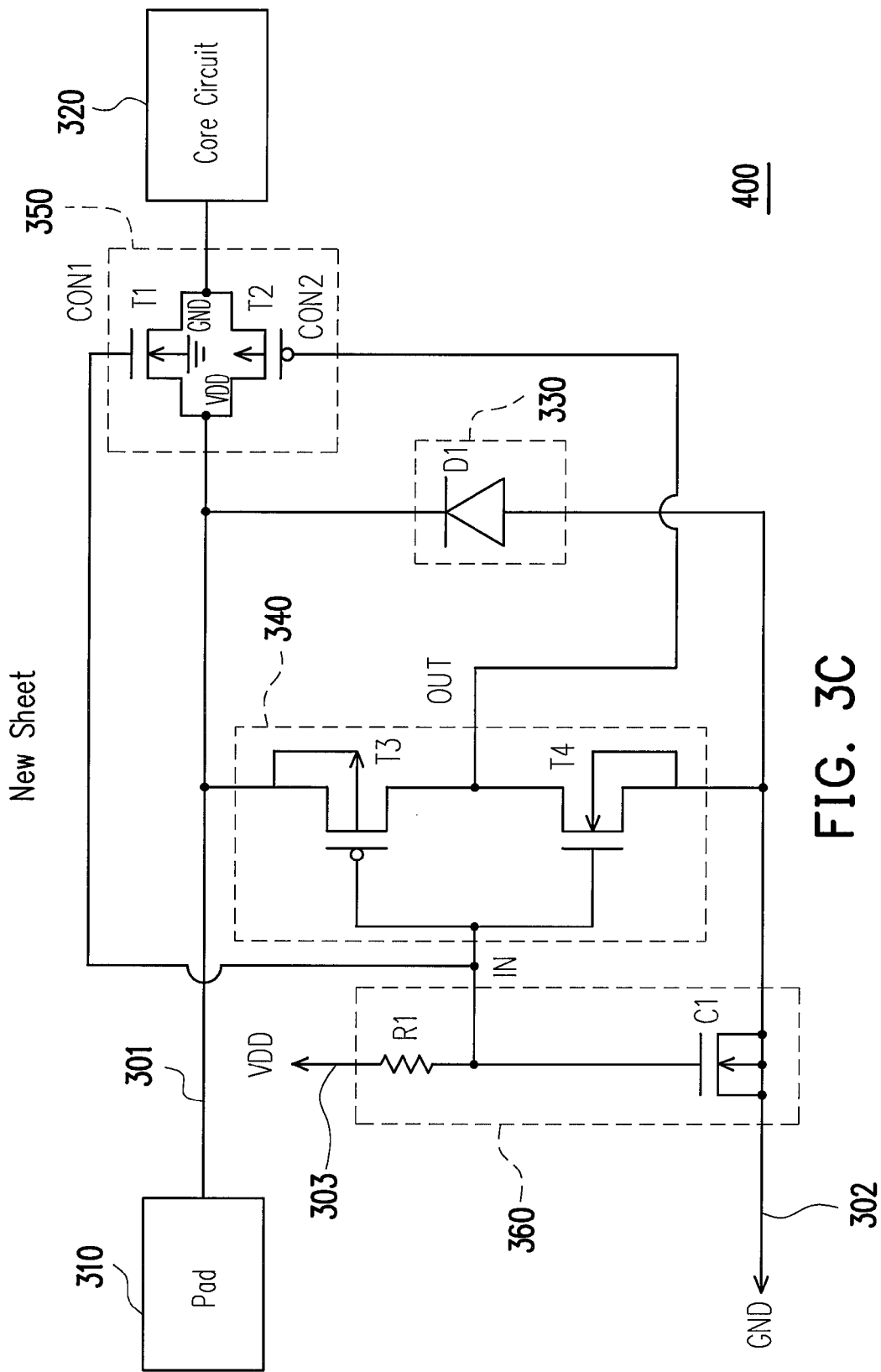
FIG. 3C is another circuit diagram of the ESD avoiding circuit of FIG. 3A.

FIG. 3C is another circuit diagram of the ESD avoiding circuit of FIG. 3A. As shown in FIG. 3C, the first ESD protection unit 330 of the embodiment is realized with a diode D1. And the diode D1 has a cathode coupled to the first conducting path 301, and an anode coupled to the second conducting path 302.

Figure 4:
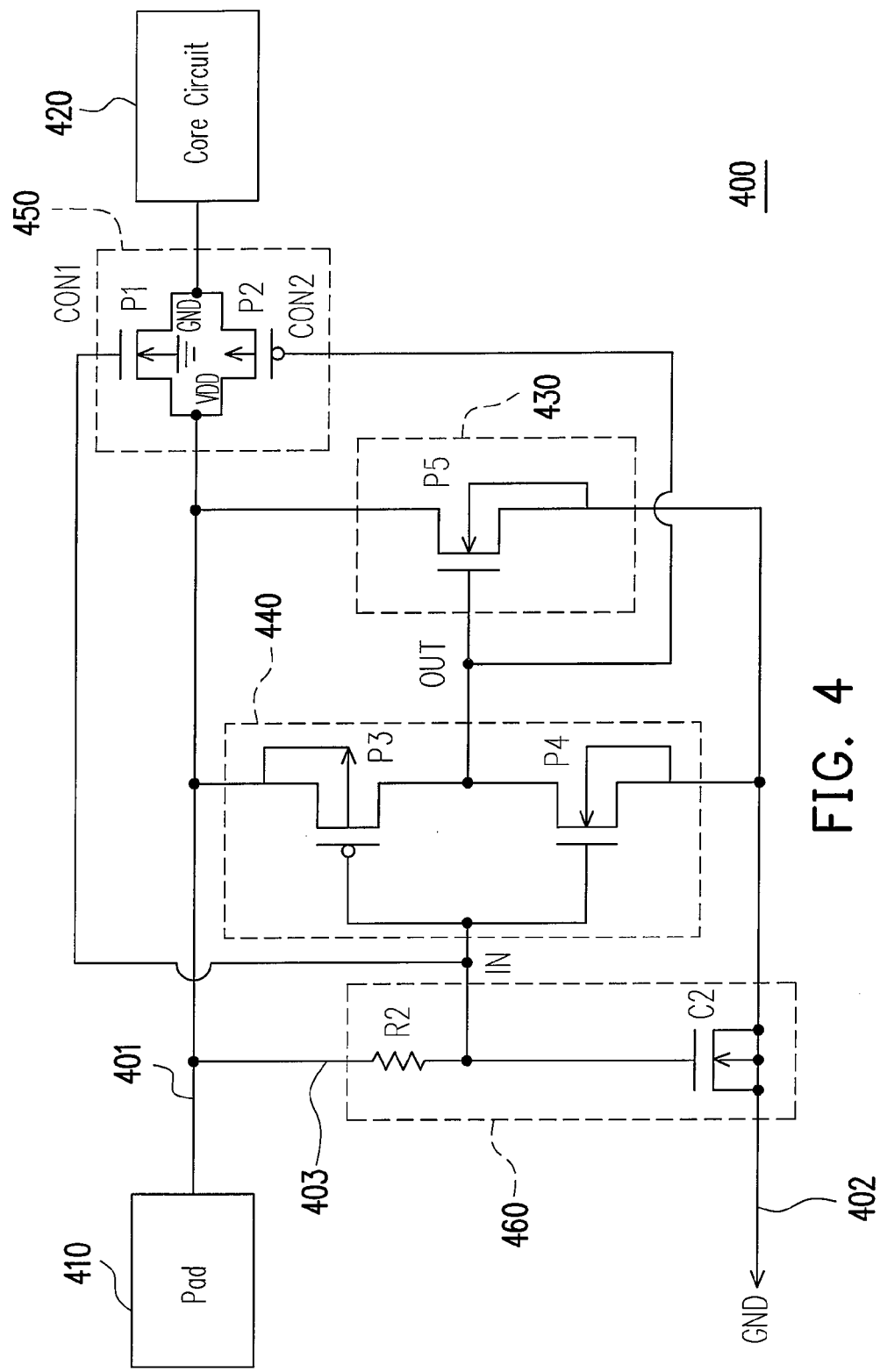
FIG. 4 is a circuit diagram of an ESD avoiding circuit according to another embodiment of the present invention.

FIG. 4 is a circuit diagram of an ESD avoiding circuit according to another embodiment of the present invention. Referring to FIG. 3B and FIG. 4, the embodiment of FIG. 4 differs from the embodiment of FIG. 3B, in that a third conducting path 403 is coupled to a first conducting path 401. As such, when a high pulse of an ESD enters from a pad 410, only after a time constant $\tau$, will a voltage difference between two terminals of a capacitor C2 of an RC filter unit 460 achieve a voltage level of the pad 410. According to the current embodiment, the time constant $\tau$ is subject to properly design, for example 1 micro-second, so as to allow the RC filter unit 460 to couple a logic low level signal (the ground voltage GND hereby) to the input terminal IN of the ESD detection unit 440 during the period of the time constant $\tau$, when the ESD occurs, and therefore the transistor P3 is conducted. As such, a logic high level signal (a signal of the pad 410 hereby) is coupled to the output terminal OUT of the ESD detection unit 440 via the conducted transistor P3, so as to conduct a transistor P5 inside the first ESD protection unit 430, and therefore guide the ESD current to a second conducting path GND.

Further, during the period of the time constant τ, the transistors P1 and P2 inside the switch unit 450 are not conducted, so that the ESD current won't enter the core circuit 420. The operation of the current embodiment in a regular operation mode is similar to that of the embodiment of FIG. 3B, and can be learnt by referring to the description thereof, and is not to be iterated hereby.

Figure 5:
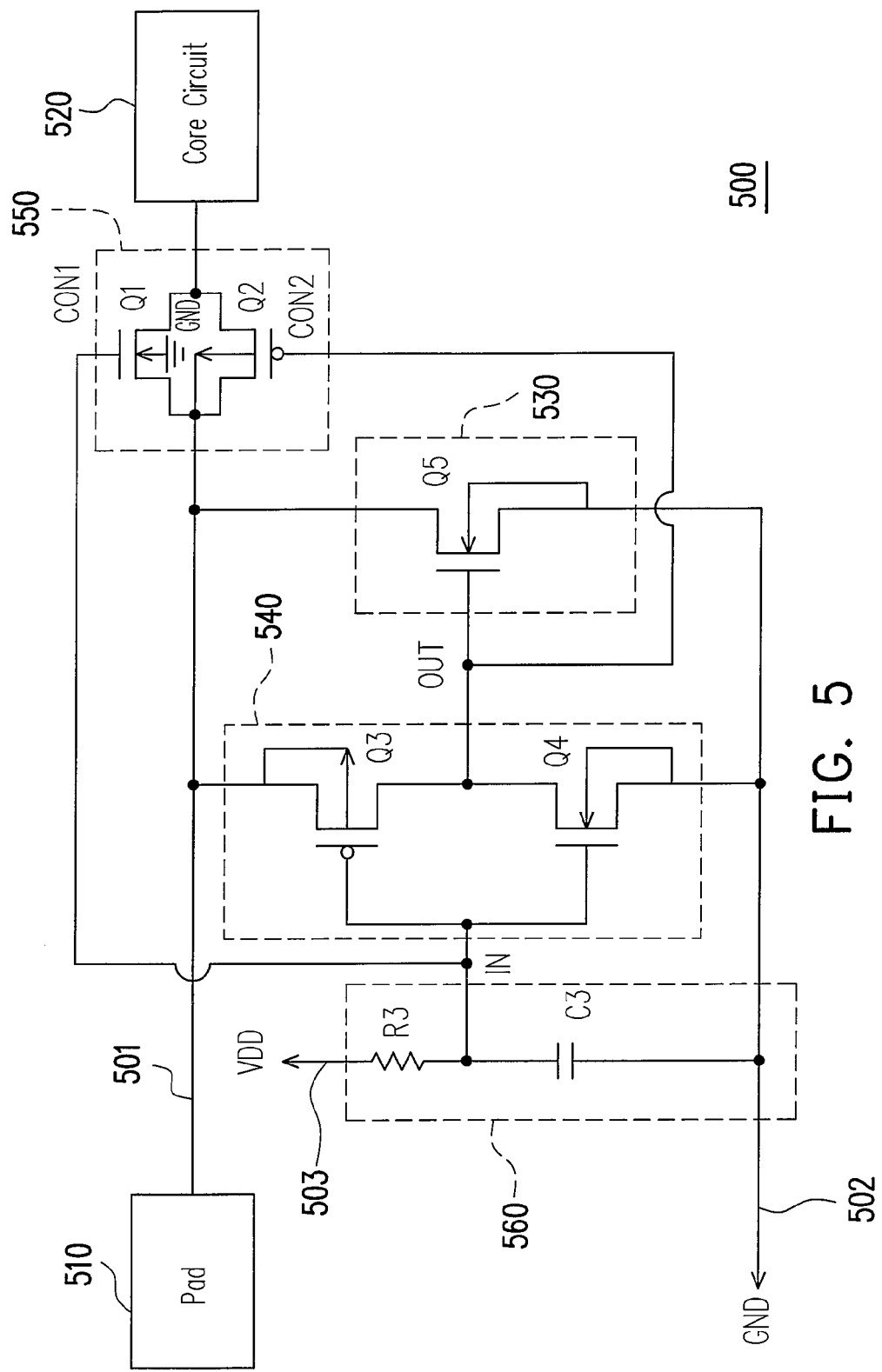
FIG. 5 is a circuit diagram of an ESD avoiding circuit according to a further embodiment of the present invention.

FIG. 5 is a circuit diagram of an ESD avoiding circuit according to a further embodiment of the present invention. Referring to FIGS. 3B and 5, the embodiment of FIG. 5 differs from the embodiment of FIG. 3B in that a substrate of a transistor Q2 of a switch unit 550 is coupled to a first conducting path 501, i.e. coupled to a pad 510, and a capacitor C3 of an RC filter unit 560 is configured with a metal-insulator-metal (MIM) configuration. Similar as described in the embodiment of FIG. 3B, when the ESD occurs, signals CON1 and CON2 of an input terminal IN and an output terminal OUT of an ESD detection unit 540 respectively control transistors Q1 and Q2 inside a switch unit 550 not to conduct, so as to block the ESD current from flowing into a core circuit 520, and control a transistor Q5 inside a first ESD protection unit 530 to conduct, so as to guide the ESD current in time.

In a regular operation mode, supposing that a maximum system voltage of the core circuit 520 is 3.3 volts, and an operation voltage provided via the pad 510 to the core circuit 520 is 7 volts, the signals CON1 and CON2 of the input terminal IN and the output terminal OUT of the ESD detection unit 540 respectively control the transistors Q1 and Q2 inside the switch unit 550 to conduct. Because a substrate of the transistor Q2 is coupled to the first conducting path 501, the operation voltage which is higher than the maximum system voltage VDD can be provided via the transistor Q2 to the core circuit 520. In the current embodiment, the ESD avoiding circuit 500 is adapted to not only avoid the ESD current from flowing into the core circuit 520 when an ESD occurs, but also allow providing an operation voltage which is higher than a maximum system voltage VDD of the core circuit 520 to the core circuit 520.

However, in this condition, a gate (the input terminal IN) of a transistor Q3 inside the ESD detection unit 540 is coupled to the system voltage VDD, and a first source/drain of the transistor Q3 is coupled to the first conducting path 501. As such, when providing the operation voltage which is higher than the maximum system voltage VDD of the core circuit 520 to the core circuit 520, a voltage between the first source/drain and the gate of the transistor Q3 is greater than a trigger-on voltage thereof, so as likely to generate a leakage current. However, the transistor Q3 has a relatively small area, and therefore such a leakage current is acceptable in some circuits.

Figure 6:
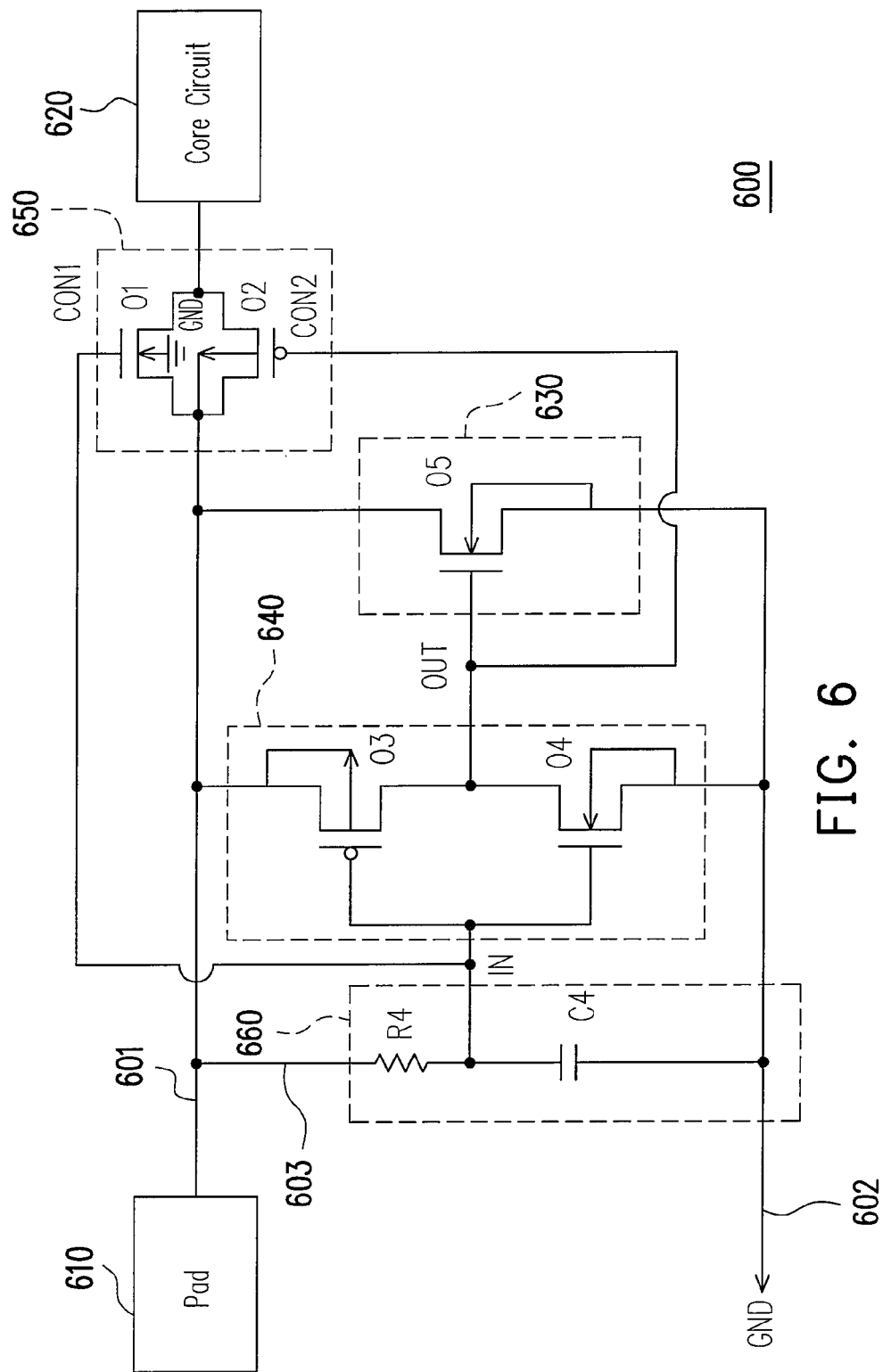
FIG. 6 is a circuit diagram of an ESD avoiding circuit according to yet another embodiment of the present invention.

FIG. 6 is a circuit diagram of an ESD avoiding circuit according to yet another embodiment of the present invention. Referring to FIGS. 5 and 6, the embodiment of FIG. 6 differs from that of FIG. 5 in that a third conducting path 603 in FIG. 6 is coupled to a first conducting path 601. As such, when an ESD occurs, only after a time constant τ, e.g., 1 micro-second, will a voltage difference between two terminals of a capacitor C4 of an RC filter unit 660 achieve a voltage level of a pad 610. As such, in such a time constant T, the RC filter unit 660 couples a logic low level signal (the ground voltage GND hereby) to an input terminal IN of the ESD detection unit 640, so as to conduct a transistor O3. Therefore, a logic high level signal (a signal of the pad 610 hereby) is coupled via the conducted transistor O3 to an output terminal OUT of the ESD detection unit 640, so as to conduct a transistor O5 inside a first ESD protection unit 630, and guide the ESD current to a second conducting path 602 in time.

In a regular operation mode, supposing that a maximum system voltage of the core circuit 620 is 3.3 volts, and an operation voltage provided via the pad 610 to the core circuit 620 is 7 volts, after the foregoing assumed time constant τ, a voltage difference between two terminals of a capacitor C4 inside the ESD detection unit 660 will be charged to the voltage level of the pad 610, that is 7 volts. Generally, a programming time (for example 10 miniseconds) for providing the operation voltage to the core circuit 620 for operation is greater than the time constant τ for which the capacitor C4 is charged. As such, after the time constant τ, a voltage level of the gate of the transistor O3 (input terminal IN) inside the ESD detection unit 640 is 7 volts, and the voltage difference between the first source/drain and the gate of the transistor O3 won't be greater than the trigger-on voltage, and therefore the leakage current won't occur.

Figure 7:
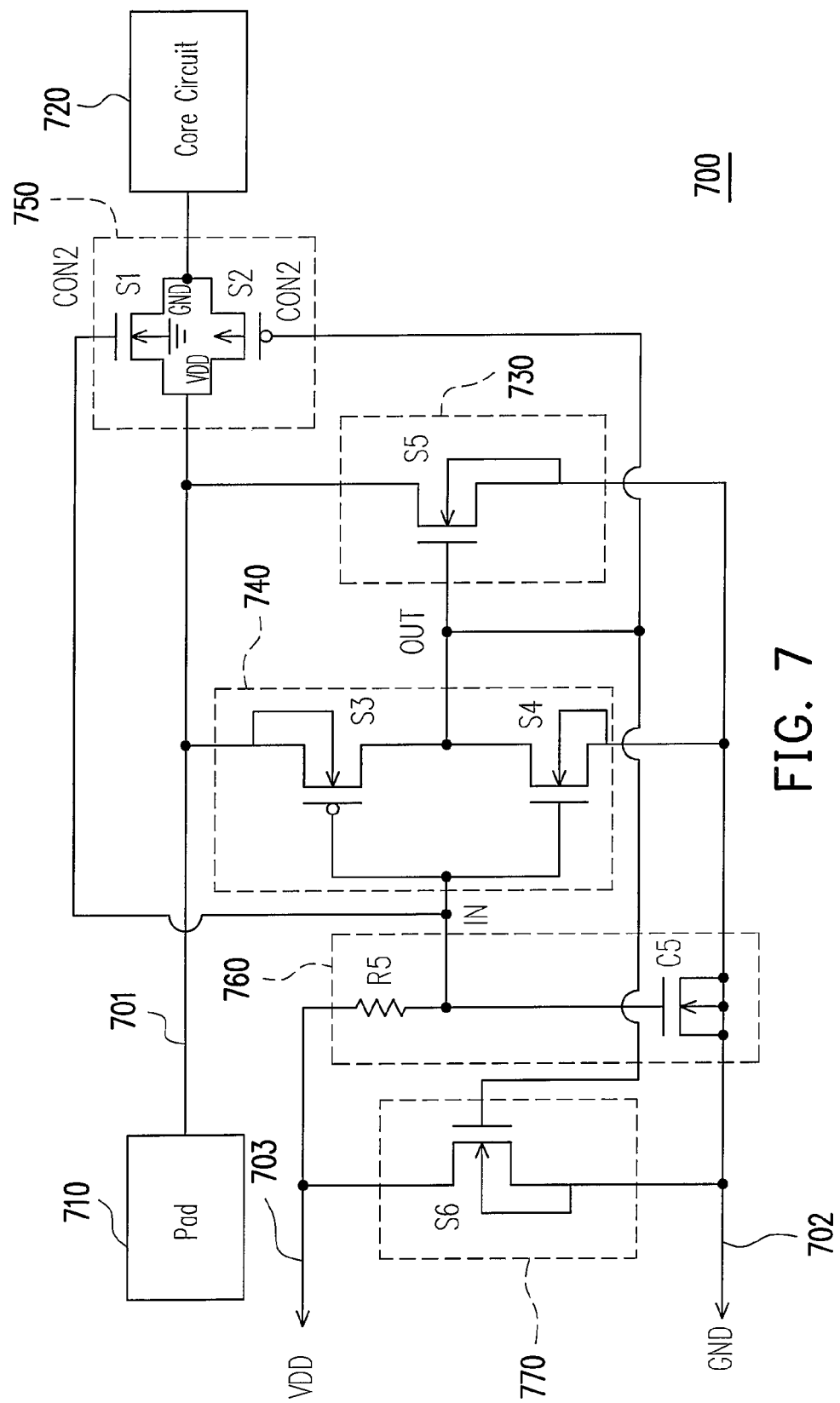
FIG. 7 is a circuit diagram of an ESD avoiding circuit according to yet another embodiment of the present invention.

The above illustrated embodiments are in an assumption of guiding the ESD current from the first conducting path to the second conducting path when the ESD occurs. However, for the convenience of allowing those of ordinary skills in the art to understand and practice the present invention, a further embodiment is illustrated herebelow. FIG. 7 is a circuit diagram of an ESD avoiding circuit according to yet another embodiment of the present invention. Referring to FIGS. 3B and 7, the embodiment of FIG. 7 differs from that of FIG. 3B in that it illustrates an ESD avoiding circuit 700 further includes a second ESD protection unit 770, for transmitting the ESD current between the second conducting path 702 and the third conducting path 703. The second ESD protection unit 770 includes a transistor S6, which is an N-type transistor including a substrate, a first source/drain, a second source/drain and a gate. The substrate and the first source/drain of the transistor S6 are coupled to the second conducting path 702. The gate of the transistor S6 is coupled to an output terminal OUT of the ESD detection unit 740. When the ESD detection unit 740 detects an ESD has occurred, a signal CON2 of the output terminal OUT controls transistors S5 and S6 to conduct, so as to guide the ESD current to the third conducting path 703.

Figure 8:
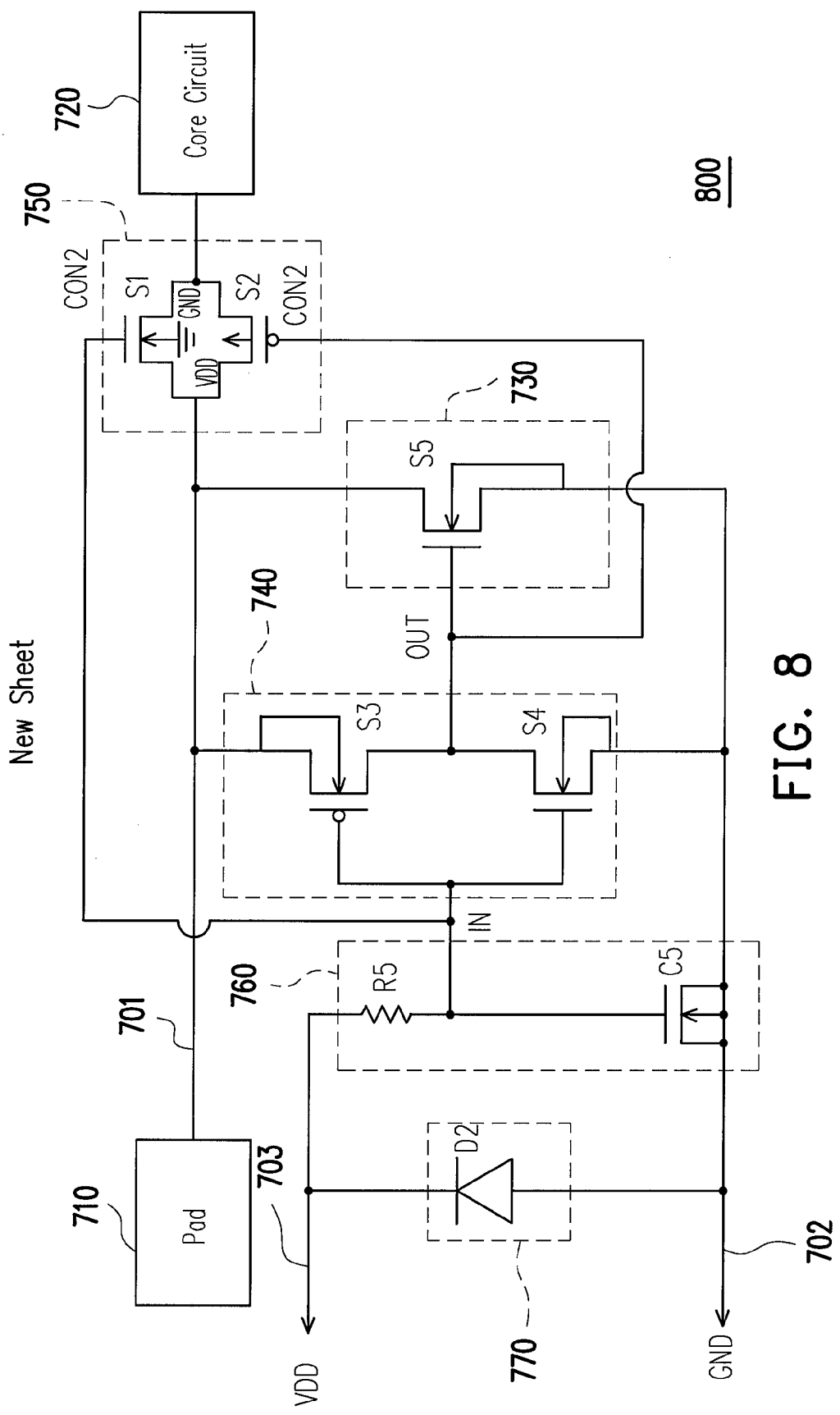
FIG. 8 is another circuit diagram of the ESD avoiding circuit according to yet another embodiment of the present invention.

It should be noted that although the second ESD protection unit 770 of the embodiment of FIG. 7 is realized with a transistor S6, those having ordinary skill in the art may use a diode for substituting the same. FIG. 8 is another circuit diagram of the ESD avoiding circuit according to yet another embodiment of the present invention. As shown in FIG. 8, the second ESD protection unit 770 is realized with a diode D2, and an anode and a cathode of the diode D2 can be coupled respectively to the second conducting path 702 and the third conducting path 703. Further, the switch unit 750 can be modified by including the switch unit 550 or 650 as shown in FIG. 5 or 6, in which the substrate of the transistor S2 can be coupled to the first conducting path 701, so as to allow a voltage higher than the maximum system voltage of the core circuit 720 to be provided to the core circuit 720 for driving the same for operation.

In summary, as shown in the embodiments as shown in FIGS. 3A, 3B, and 4, when an ESD occurs, the ESD avoiding circuits 300 and 400 control the switch units 350 and 450 to cut off connections between the first conducting paths 301 and 401 and the core circuits 320 and 420, so as to avoid the ESD currents to flow into the core circuits 320 and 420. As such, the embodiments of the present invention adopts the switch units 350, 450 to block, avoid the ESD current from entering the core circuits 320, 420, which can save the area of implanting silicide block in the layout. On the other hand, the ESD detection units 340 and 440 control the first ESD protection units 330 and 430 to guide the ESD current. While in a regular operation mode, the embodiments as shown in FIGS. 3A, 3B, and 4, control the switch units 350 and 450 to conduct the first conducting paths 301 and 401 to the core circuits 320 and 420, so as to allow the operation voltage to be provided to the core circuit 320 and 420 for driving the same for operation.

Furthermore, the ESD avoiding circuit 500 of the embodiment of FIG. 5, is adapted to not only guide the ESD current when the ESD occurs, but also allow providing an operation voltage which is higher than a maximum system voltage VDD of the core circuit 520 to the core circuit 520 for operation by coupling the substrate of the transistor Q2 inside the switch unit 550 to the first conducting path 501. The embodiment of FIG. 6 improves the embodiment of FIG. 5 by further reducing the risk of generating a leak current thereby.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electrostatic discharge (ESD) avoiding circuit, comprising:
    a first ESD protection unit, for transmitting an ESD current between a first conducting path and a second conducting path;
    an ESD detection unit, coupled between the first conducting path and the second conducting path, and having an input terminal and an output terminal coupled to the first ESD protection unit, for detecting whether or not an ESD occurred, and controlling the first ESD protection unit to conduct the ESD current according to a result of the detection;
    an RC filter unit, coupled between the second conducting path and a third conducting path, for coupling a first voltage to the input terminal; and
    a switch unit, coupled between the first conducting path and a core circuit, for determining whether or not to conduct the first conducting path to the core circuit according to signals of the input terminal and the output terminal of the ESD detection unit, wherein the switch unit comprises:
    a first transistor, having a gate coupled to the input terminal, a first source/drain coupled to the first conducting path, and a second source/drain coupled to the core circuit; and
    a second transistor, having a gate coupled to the output terminal, a first source/drain coupled to the first source/drain of the first transistor, and a second source/drain coupled to the second source/drain of the first transistor.

2. The ESD avoiding circuit according to claim 1, wherein the RC filter unit comprises:
    a first resistor, having a first terminal coupled to the third conducting path and a second terminal coupled to the input terminal; and
    a first capacitor, having a first terminal coupled to the second terminal of the first resistor and a second terminal coupled to the second conducting path.

3. The ESD avoiding circuit according to claim 1, wherein the second transistor further has a substrate coupled to the first conducting path.

4. The ESD avoiding circuit according to claim 1, wherein the second transistor further has a substrate coupled to a second voltage.

5. The ESD avoiding circuit according to claim 1, wherein the ESD detection unit comprises:
    a third transistor, having a gate serving as the input terminal, both of a substrate and a first source/drain coupled to the first conducting path, and a second source/drain serving as the output terminal; and
    a fourth transistor, having a gate coupled to the gate of the third transistor, a first source/drain coupled to the second source/drain of the third transistor, and both of a substrate and a second source/drain are coupled to the second conducting path.

6. The ESD avoiding circuit according to claim 1, wherein the first ESD protection unit comprises:
    a fifth transistor, having a gate, coupled to the output terminal, a first source/drain coupled to the first conducting path, and both of a substrate and a second source/drain coupled to the second conducting path.

7. The ESD avoiding circuit according to claim 1, wherein the first ESD protection unit comprises:
    a first diode, having a cathode coupled to the first conducting path, and an anode coupled to the second conducting path.

8. The ESD avoiding circuit according to claim 1, further comprising:
    a second ESD protection unit, for transmitting the ESD current between the second conducting path and the third conducting path.

9. The ESD avoiding circuit according to claim 8, wherein the second ESD protection unit comprises:
    a sixth transistor, having a gate coupled to the output terminal, both of a substrate and a first source/drain coupled to the second conducting path, and a second source/drain coupled to the third conducting path.

10. The ESD avoiding circuit according to claim 8, wherein the second ESD protection unit comprises:
    a second diode, having an anode coupled to the second conducting path, and a cathode coupled to the third conducting path.

11. The ESD avoiding circuit according to claim 1, wherein the first conducting path is coupled to an input pad.

12. The ESD avoiding circuit according to claim 1, wherein the first conducting path is coupled to an output pad.

13. The ESD avoiding circuit according to claim 1, wherein the second conducting path is coupled to a ground voltage.

14. The ESD avoiding circuit according to claim 1, wherein the third conducting path is coupled to a system voltage.

15. The ESD avoiding circuit according to claim 1, wherein the third conducting path is coupled to the first conducting path.

* * * * *